(12) United States Patent
Henline

(10) Patent No.: US 7,775,605 B2
(45) Date of Patent: Aug. 17, 2010

(54) VEHICLE WHEEL WITH ROCK GUARD

(75) Inventor: Douglas E. Henline, Fallbrook, CA (US)

(73) Assignee: Douglas Technologies Group, Inc., Vista, CA (US)

( * ) Notice: Subject to any disclaimer, the term of this patent is extended or adjusted under 35 U.S.C. 154(b) by 132 days.

(21) Appl. No.: 12/191,056

(22) Filed: Aug. 13, 2008

(65) Prior Publication Data

US 2010/0038957 A1    Feb. 18, 2010

(51) Int. Cl.
*B60B 3/08*    (2006.01)
(52) U.S. Cl. ............... 301/64.303; 301/6.3; 301/64.301
(58) Field of Classification Search ............ 301/35.621, 301/35.628, 64.301, 64.302, 64.303, 64.304, 301/64.305, 64.306, 64.307, 63.101, 63.107, 301/63.108, 95.107, 6.3, 37.28, 37.41, 37.105, 301/37.107, 36.1, 64.701; 152/DIG. 1, DIG. 10; D12/7; 280/156
See application file for complete search history.

(56) References Cited

U.S. PATENT DOCUMENTS

| | | | |
|---|---|---|---|
| 2,948,055 A * | 8/1960 | Baxter et al. ............. | 29/894.31 |
| 2,983,550 A * | 5/1961 | Gannett ................. | 301/64.303 |
| 3,135,559 A | 6/1964 | Alfes | |
| 3,256,044 A | 6/1966 | Fisher | |
| 3,826,538 A | 7/1974 | Lipper | |
| 4,223,952 A | 9/1980 | Weld | |
| 4,252,169 A | 2/1981 | Watts | |
| 4,606,581 A | 8/1986 | Zepf | |
| 4,640,330 A | 2/1987 | Frassica | |
| 5,271,665 A | 12/1993 | O'Coin | |
| 6,000,762 A | 12/1999 | Chang | |
| 6,340,210 B1 | 1/2002 | Handa et al. | |
| 6,439,670 B1 | 8/2002 | Winters | |
| 6,644,756 B1 | 11/2003 | Handa et al. | |
| 7,246,860 B1 | 7/2007 | Seitz | |
| 2003/0155804 A1 | 8/2003 | Weckman, Jr. et al. | |
| 2004/0195905 A1 | 10/2004 | French, III et al. | |

(Continued)

FOREIGN PATENT DOCUMENTS

KR    1020070018300    2/2007

OTHER PUBLICATIONS

Photographs of Installation of Polaris External Rock Guard Plate (Polaris earliest date unknown).

(Continued)

*Primary Examiner*—S. Joseph Morano
*Assistant Examiner*—Kip T Kotter
(74) *Attorney, Agent, or Firm*—Procopio, Cory, Hargreaves & Savitch LLP

(57) ABSTRACT

A wheel assembly for a vehicle includes a wheel having a first rim half and a second rim half secured together to form an annular outer rim for receiving a tire. The rim halves have aligned central openings and aligned apertures for receiving fasteners for mounting a wheel hub on the wheel. In one embodiment, at least the central opening of one of the rim halves includes a plurality of spaced recesses around its periphery. A rock guard built into the wheel includes a plurality of rock guard formations each forming a shield which fills at least a major portion of any space between a respective recess and the wheel hub to block at least some debris from passing through the wheel while allowing airflow through the wheel.

11 Claims, 8 Drawing Sheets

U.S. PATENT DOCUMENTS

| | | |
|---|---|---|
| 2005/0168054 A1 | 8/2005 | Handa et al. |
| 2005/0173970 A1* | 8/2005 | Lin ..................... 301/64.305 |
| 2005/0200193 A1 | 9/2005 | Hodges et al. |
| 2005/0269866 A1 | 12/2005 | McGoon, IV |
| 2005/0280307 A1 | 12/2005 | Wood |
| 2006/0037685 A1 | 2/2006 | Clements et al. |
| 2007/0290548 A1 | 12/2007 | Lundy |

OTHER PUBLICATIONS

CANAM External Rock Guard Plate, Date Unknown.
YAMAHA External Rock Guard Plate, Date Unknown.
SUZUKI External Rock Guard Plate, Date Unknown.
International Search Report and Written Opinion dated Jan. 20, 2010 for PCT/US09/049291.

* cited by examiner

VEHICLE WHEEL WITH ROCK GUARD

BACKGROUND

1. Field of the Invention

The present invention relates to a vehicle wheel with rock guard, and is particularly concerned with rock guards for all terrain vehicles (ATVs) and other off road vehicles.

2. Related Art

Wheels, for example ATV and other off road vehicle wheels, commonly have cut outs in their central openings, both to add decoration to the wheel and reduce the weight and expense of these parts. These openings on the wheels are vulnerable to rocks and debris thrown up and propelled through the wheel openings. This may cause damage to the brake assembly and the wheel.

In some wheels, this problem is solved by mounting a rock guard plate between the wheel and hub to protect the mechanism. However, the separate rock guard plate may be forgotten and left off the wheel, and can be awkward to mount.

What is needed is an improved device that is designed to avoid or reduce the problems of rocks and debris entering the wheel openings and potentially causing damage to the wheel mechanism.

SUMMARY

In one embodiment, a vehicle wheel with rock guard is provided which comprises a wheel having a front or outer rim half and a rear or inner rim half secured together to form an annular outer rim for receiving a tire. The front and rear rim halves have aligned central openings for receiving a hub and aligned apertures for receiving fasteners for mounting the hub to the inner rim half. The fasteners can include screws or nuts and bolts for fastening the hub to the wheel. At least the central opening of one of the rim halves includes a plurality of spaced recesses around its periphery. In one embodiment, a rock guard is built into the wheel, and the rock guard includes a plurality of rock guard portions or formations each forming a shield which fills at least a major portion of any space between a respective recess and the wheel hub to block larger debris from passing through the wheel.

In one embodiment, the rock guard comprises a separate reinforcement or rock guard plate secured between the front rim half and the rear rim half and having a central opening aligned with central openings in the front and rear rim halves. Rock guard portions project radially inwardly from the central opening in the plate to form shields which substantially fill any opening or space which would otherwise extend through the wheel after attachment of the wheel to the hub. The rim halves and separate reinforcement plate can be secured together by welding or the like, thereby integrating the rock guard plate with the wheel as a unitary structure. In other embodiments the rock guard portions are formed integrally with an end wall of the rear or front rim half through which the central opening extends, and project radially inwardly from the central opening in the end wall. The inner edges of the rock guard portions or formations in the reinforcement plate or in the end wall may have an arcuate shape, a V-shape, or other shapes, depending on the shapes of recesses in the hub which is to be attached to the wheel.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1A:
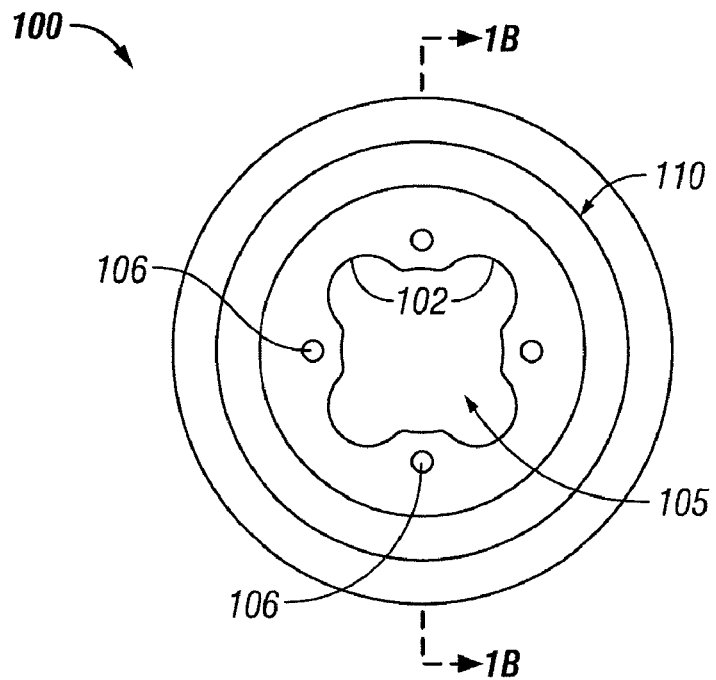
FIG. 1A illustrates an end view of a prior art wheel with no rock guard.
Figure 1B:
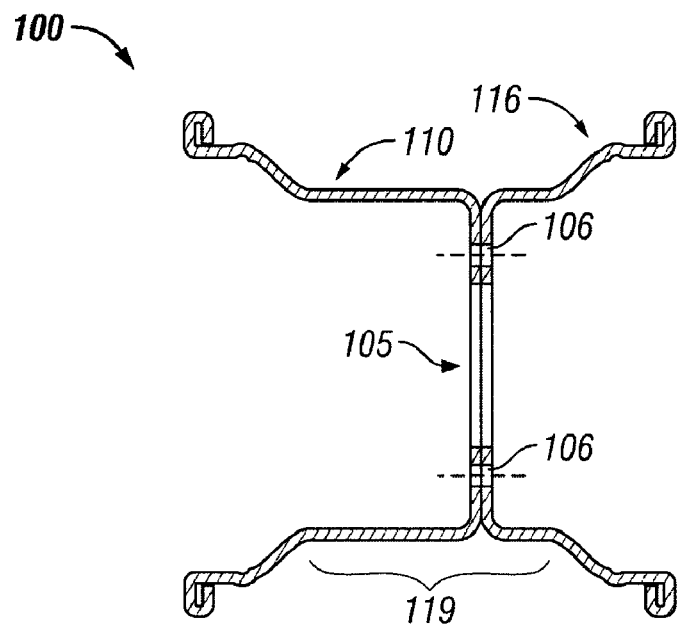
FIG. 1B is a cross-sectional view of the prior art wheel on the lines 1B-1B of FIG. 1A.
Figure 1C:
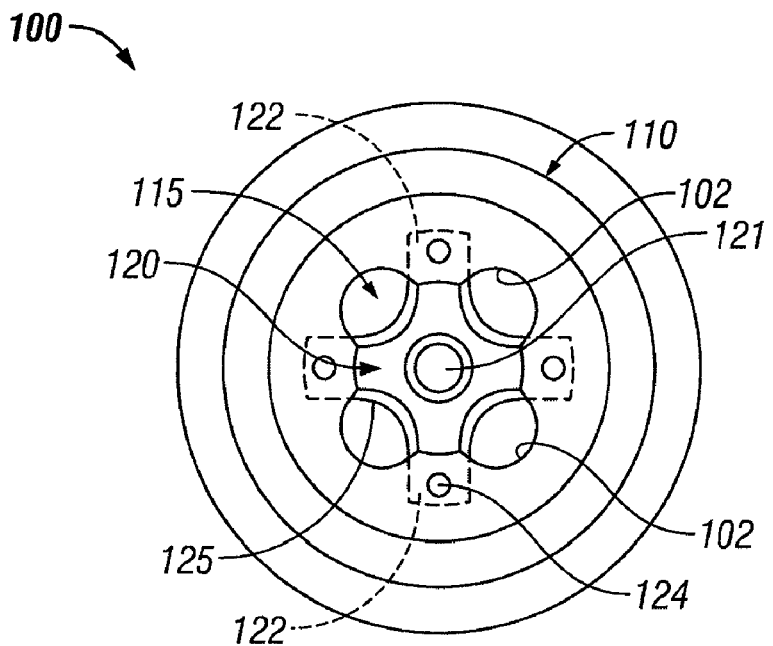
FIG. 1C illustrates an end elevation view of the prior art wheel of FIGS. 1A and 1B with a hub attached to the wheel.

FIGS. 1A to 1C illustrate a prior art ATV or off road vehicle wheel 100 with no rock guard. In this embodiment the wheel 100 comprises an outer or front rim half 110 and a rear or inner rim half 116. The rim halves are of conventional cup-like shape and have flat inner end faces or walls which are welded together to provide an annular recess or rim 119 (FIG. 1B) over which a tire can be seated. The rim halves have aligned central openings 105 for receiving the central part of a wheel hub and apertures 106 for receiving fasteners, for example, for mounting the wheel hub, such as bolts or studs which project from spokes of the wheel hub.

FIG. 1C illustrates an end elevation view of the prior art wheel 100 with a hub 120 secured to the hub face on the inner side of wheel 100. As illustrated, hub 120 has a central portion 121 and outwardly projecting portions or spokes 122 which extend over the fastener apertures in the rim half 116. Each spoke has a bolt or stud 124 aligned with the underlying fastener aperture 106. Bolts or studs 124 or the like extend from each spoke through the aligned openings and are secured by nuts (not illustrated) on their outer ends, at the outside or nut face of the wheel. A generally arcuate indent or recess 125 is located on the outer edge of the hub between each adjacent pair of spokes 122. The central openings 105 of wheels such as ATV wheels and other off road vehicle wheels commonly have a clover leaf shaped central opening, as illustrated in FIG. 1A, with arcuate shaped recesses 102 spaced about the periphery of each opening forming a clover leaf shape. These recesses are provided for ornamental reasons, and also to reduce the weight of the wheel. There may be four such recesses, as illustrated in the drawings, or three recesses in some cases.

When the hub 120 is mounted on the wheel 100, the central opening 105 is not completely filled by the hub, leaving gaps or openings 115 between each recess 102 in the wheel and the opposing recess 125 in the wheel hub, as seen in FIG. 1C, which extend completely through the wheel. The spaced openings 115 are vulnerable to rocks and debris that may be thrown through the openings in the wheel and potentially cause damage to the steering assembly, brake assembly, wheel or other parts. Such damage to the steering or brake assembly may cause failure with resultant loss of control by the driver, which could potentially cause an accident. It is known in the prior art to mount a separate rock guard plate on the hub bolts or studs between the wheel and wheel hub to cover the openings 115, using the same fasteners which secure the hub to the wheel. This arrangement has disadvantages, since it requires an additional part which the installer must remember to position between the wheel and hub when mounting the hub. This arrangement also makes the hub assembly more difficult to mount, and requires more material and additional manufacturing steps.

Figure 2A:
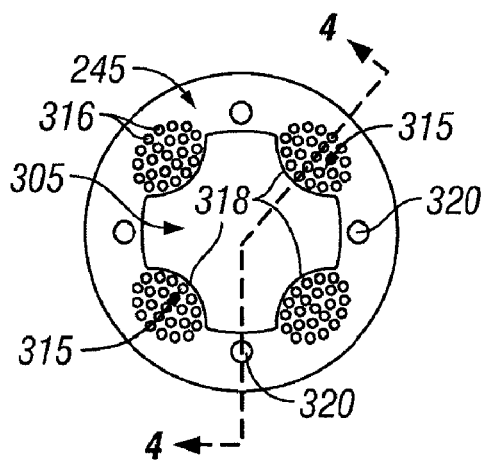
FIG. 2A is a front view of one embodiment of a reinforcement plate with an integral rock guard for integrating into a wheel.
Figure 2B:
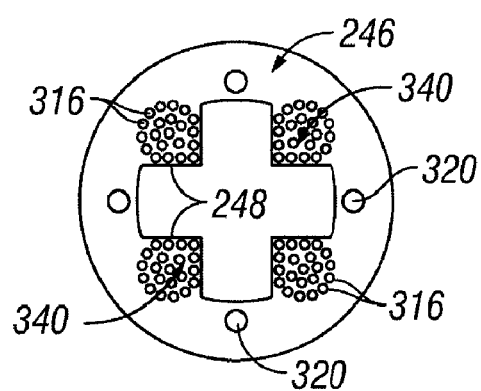
FIG. 2B illustrates an example of a second embodiment of a combined rock guard and reinforcement plate for use in a wheel.
Figure 3:
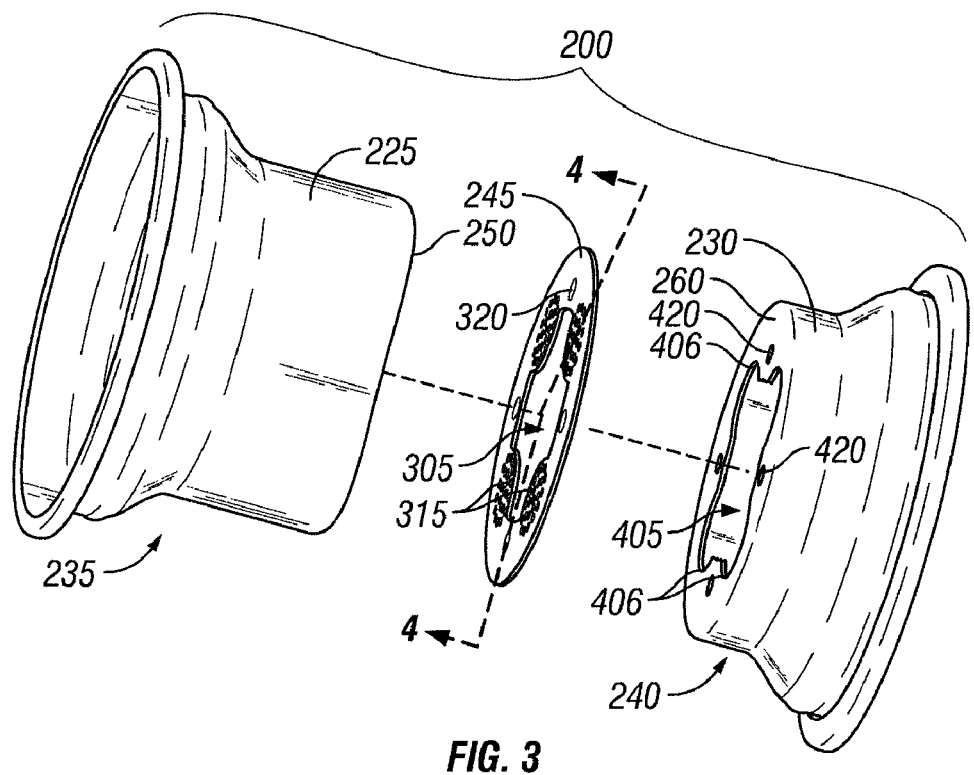
FIG. 3 is an exploded view of one embodiment of a wheel with the combined rock guard and reinforcement plate of FIG. 2A positioned between the front and rear rim halves.
Figure 4:
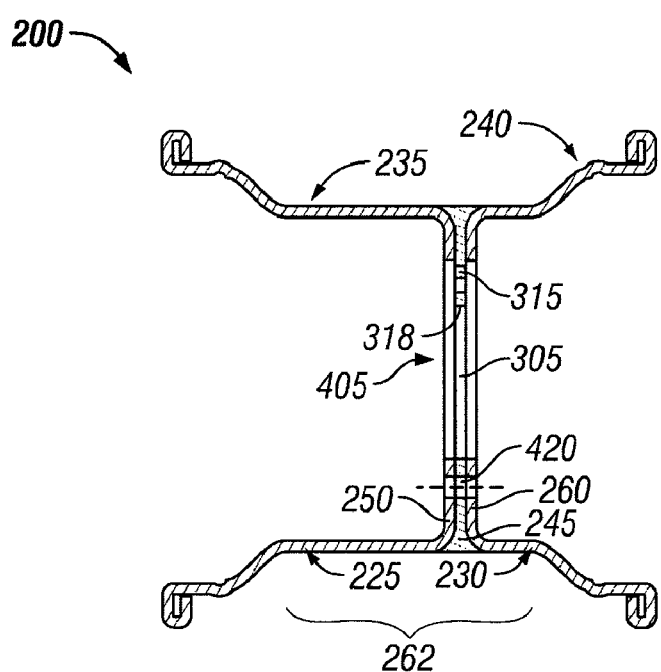
FIG. 4 is a cross-sectional view of the wheel of FIG. 3 in an assembled condition with the reinforcement plate installed between the rim halves, taken generally on the lines 4-4 of FIG. 3.
Figure 5:
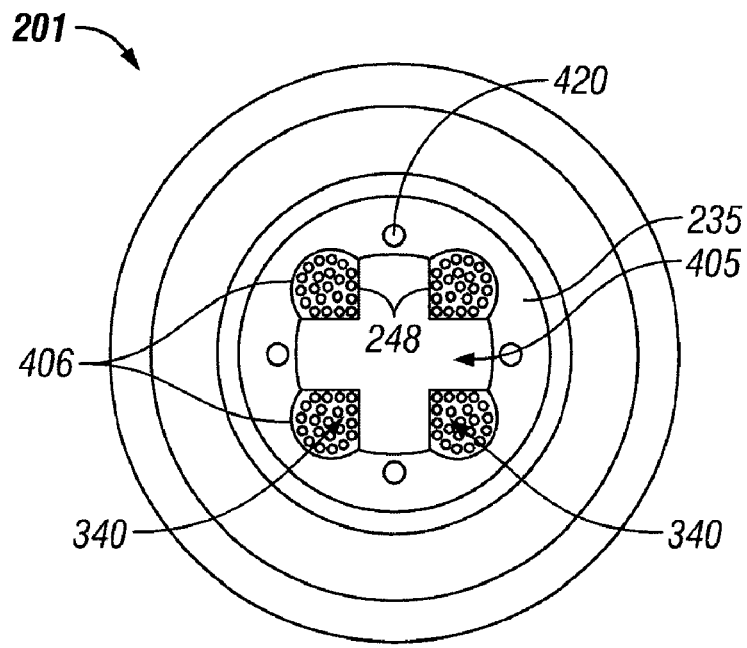
FIG. 5 is an end view of a wheel assembled as in FIGS. 3 and 4 but with the reinforcement plate of FIG. 2B replacing the reinforcement plate shown in FIGS. 2A and 4.
Figure 6:
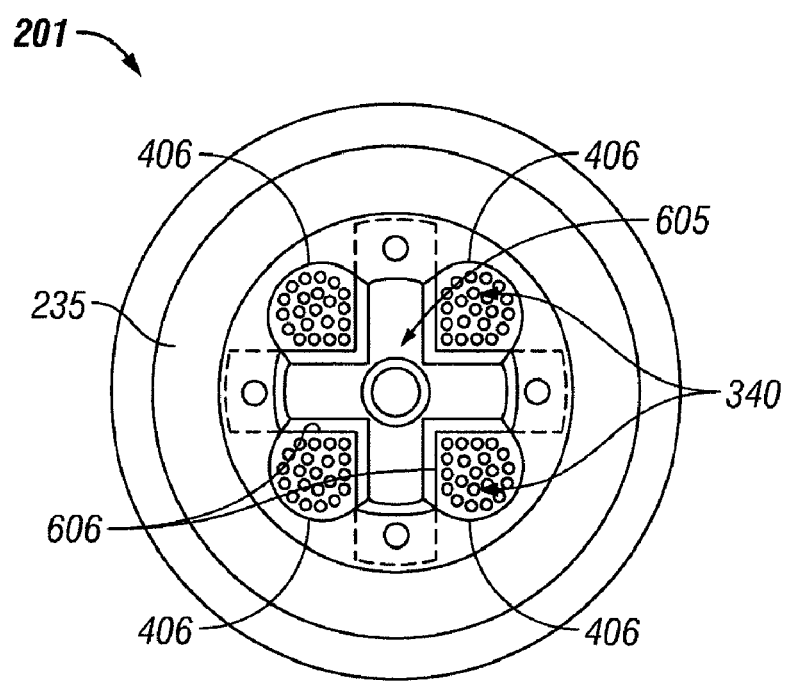
FIG. 6 is an end view of the wheel of FIG. 5 with the wheel secured to a hub.

FIGS. 2 to 6 illustrate one embodiment of a wheel 200 with a built in rock guard comprising a rock guard plate or reinforcement plate. Two alternative plates 245, 246 which may be built into the wheel are illustrated in FIGS. 2A and 2B. FIGS. 3 and 4 illustrate a wheel 200 incorporating plate 245 of FIG. 2A, while FIGS. 5 and 6 illustrate a wheel 201 incorporating plate 246 of FIG. 2B.

Wheel 200 includes a front rim half 235 and a rear rim half 240 that can be secured together to form an annular outer rim for receiving a tire. In one embodiment, the front rim half 235 and the rear rim half 240 are cup-shaped and have flat inner end walls 250, 260. The rim halves are secured together by welding, bolting, or the like with the rock guard or reinforcement plate 245 sandwiched between the inner end walls 250 and 260, as illustrated in FIGS. 3 and 4. The front and rear rim halves 235 and 240 are similar or identical in shape to the rim halves of the prior art wheel of FIGS. 1A to 1C, and have rims 225, 230 extending outwardly in opposite directions from the respective inner end walls 250,260 to define an annular tire seat or outer rim 262 (FIG. 4) for receiving a tire. Aligned clover leaf-shaped openings 405 with arcuate recesses 406 are provided in each end wall 250, 260, along with spaced fastener openings 420 for receiving bolts or other fasteners to secure the wheel to a wheel hub at the outer or hub face of the rear wheel rim half 240.

FIG. 2A illustrates one embodiment of a rock guard or reinforcement plate 245 which is also shown positioned between the wheel rim halves in FIG. 4. Plate 245 is generally circular in shape and has a diameter which substantially matches the diameter of the wheel rim end walls 250, 260, and has a central opening 305 aligned with the rim half openings 405. Fastener openings 320 in plate 245 are positioned for alignment with the fastener openings 420 in the end walls of the two rim halves when assembled, as illustrated in FIGS. 3 and 4. The central opening 305 has inwardly projecting, arcuate rock guard portions or formations 315 spaced around the periphery of the opening 305 and positioned to substantially fill openings 115 when a hub 120 of the shape illustrated in FIG. 1C is mounted on the inside of the wheel. The rock guard formations or portions 315 form shields over at least most of the area of any openings through the wheel when a hub is secured to the wheel, so as to block at least larger debris from passing through the wheel, but have plural small openings 316 which allow air to circulate for cooling of the wheel and the braking system. The inner edge 318 of each rock guard portion 315 is arcuate in shape, substantially matching the shape of the recesses 125 in the hub 120 in FIG. 1C. The wheel 200 with built in rock guard reinforcement plate 245 has no large gaps or openings extending through the wheel when a hub 120 of the shape illustrated in FIG. 1C is installed on the rear wheel rim half, since openings 115 of FIG. 1C are at least substantially filled by the rock guard formations 315. Large debris is therefore blocked from passing through the wheel, reducing the risk of damage. At the same time, the wheel is reinforced and strengthened by the presence of the reinforcement plate 245. Once the rim halves are secured together with the reinforcement plate sandwiched between their inner end walls, an integral wheel structure with a built-in rock guard is formed. The installer therefore does not have to remember to install a separate wheel guard plate between the wheel and hub.

Not all hubs have recesses 125 of arcuate shape. FIG. 2B illustrates a modified rock guard reinforcement plate 246 which may be mounted between the wheel rim halves 235, 240 as in FIG. 5 to form a modified wheel for use with a hub 605 as illustrated in FIG. 6 which has generally square or V-shaped indents or recesses 606. Reinforcement plate 246 has modified rock guard portions or formations 340 which have V-shaped or square shaped inner edges 248. The reinforcement plate 246 is otherwise identical to plate 245, and like reference numbers are used for like parts as appropriate.

The modified wheel 201 of FIGS. 5 and 6 is identical to wheel 200 except that reinforcement plate 245 is replaced with reinforcement plate 246 with V-shaped rock guard formations 340. Plate 246 is mounted between the wheel rim halves 235, 240 in the same way as illustrated in FIGS. 3 and 4. When welded or otherwise secured between rim halves 235, 240, reinforcement plate 246 is positioned exactly as shown for plate 245 in FIG. 4. FIG. 5 is a front view of the wheel 201 before installation on the hub and wheel axle, and FIG. 6 illustrates hub 605 with square or V-shaped indents or recesses 606 secured inside the wheel using nuts and bolts. As can be seen in FIG. 6, the rock guard formations 340 are configured to shield and substantially cover any openings which would otherwise be left between the arcuate recesses 406 in the clover leaf shaped openings in the front and rear rim halves and the opposing square or V-shaped indents 606 in the hub.

The angle of the V-shaped rim in FIG. 2B may vary and may be greater than 90 degrees or less than 90 degrees in other embodiments. It should be noted that the shape of rock guard plates 245 and 246 and/or the rock guard formations 315, 340 may vary in other embodiments to match different wheel rim halves and wheel rim openings, and also to correspond to the shape of indents or recesses of different wheel hubs. The rock guard plates 245 and 246 also add structural stability and rigidity to the wheel 200. In the illustrated embodiments, the rock guard formations 315, 340 include multiple holes forming a mesh to screen out debris from passing through wheel. The size of the holes may vary and in some embodiments the rock guard formations 315, 340 may have no holes.

Figure 7:
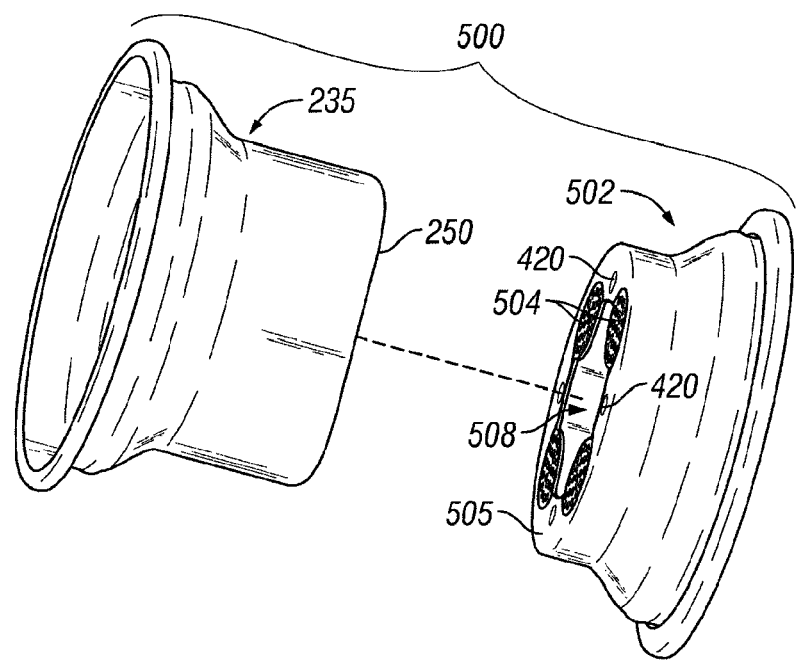
FIG. 7 is an exploded view of separate rim halves of a second embodiment of a wheel with a built-in rock guard.

FIGS. 7 to 10 illustrate a second embodiment of a wheel 500 with integral rock guard portions or formations. As in the first embodiment, the wheel 500 has front and rear rim halves 235 and 502, but the reinforcement plate of the previous embodiment is omitted. Instead, in this embodiment, rock guard portions 504 are formed integrally in the end wall 505 of rear rim half 502. The front rim half 235 is identical to the first embodiment, and like reference numerals are used for like parts as appropriate. The rock guard portions can also be integrated into the end wall of the front rim half 235 in an alternative embodiment. Front rim half 235 and rear rim half 502 are secured together by welding, bolting or the like to form an annular outer rim 540 for receiving a tire, as illustrated in FIG. 7.

Figure 8A:
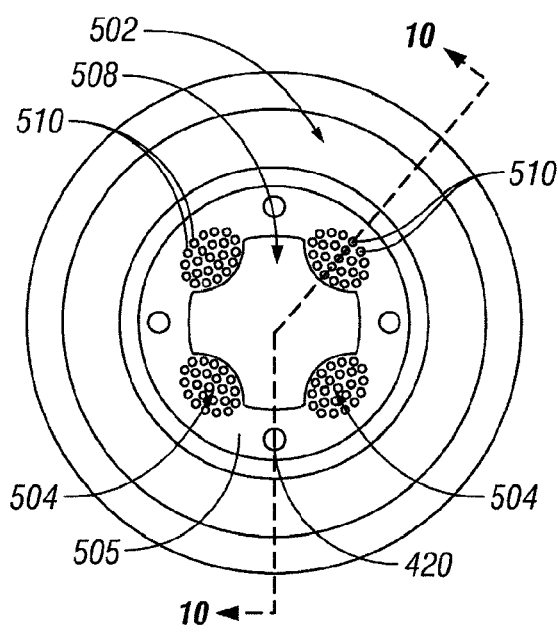
FIG. 8A is an end view of the rear rim half of FIG. 7.
Figure 9:
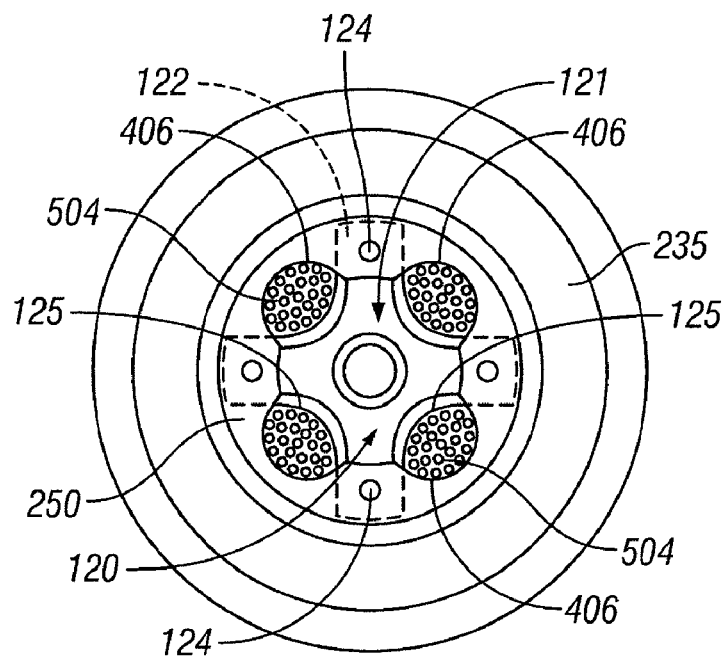
FIG. 9 is an end view of the wheel of FIGS. 7 and 8A secured to a hub.
Figure 10:
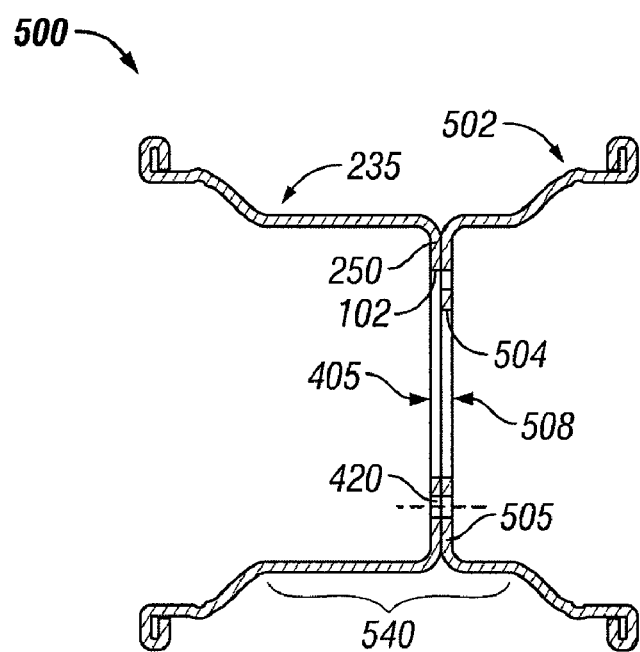
FIG. 10 is a sectional view of the wheel on the lines 10-10 of FIG. 8A.

FIG. 7 illustrates the separate rim halves 235, 502 in alignment prior to welding or bolting them together with their inner end walls 250, 505 in face-to-face engagement, as illustrated in FIG. 10. Inner end wall 250 has a clover leaf shaped central opening 405, as in the previous embodiment. Inner end wall 505 has a modified central opening 508 for alignment with opening 405. As best illustrated in FIG. 8A, opening 508 has arcuate, inwardly projecting rock guard portions 504 similar to the portions 315 of rock guard plate 245 of FIG. 2A. However, in this case, the rock guard portions 504 are formed integrally with end wall 505 of the rear rim half. End wall 505 also has fastener openings 420 for alignment with the corresponding openings 420 in the end wall 250 of the front rim half when the rim halves are assembled together. FIG. 9 illustrates a wheel hub 120 with arcuate recesses 125 secured to the wheel 500. As seen in FIG. 9, rock guard portions 504 are configured to at least substantially fill up the gaps or openings which would otherwise be formed between the arcuate recesses 406 of the clover leaf openings 405 in end wall 250 and the arcuate recesses 125 of the hub 120, as seen for a conventional wheel with no rock guard as in FIG. 1C. As in the previous embodiment, the rock guard portions 504 include multiple holes 510 forming a mesh to screen out debris from passing through wheel while allowing airflow. The size and number of the holes may vary and in some embodiments, the rock guard formations may have no holes.

Figure 8B:
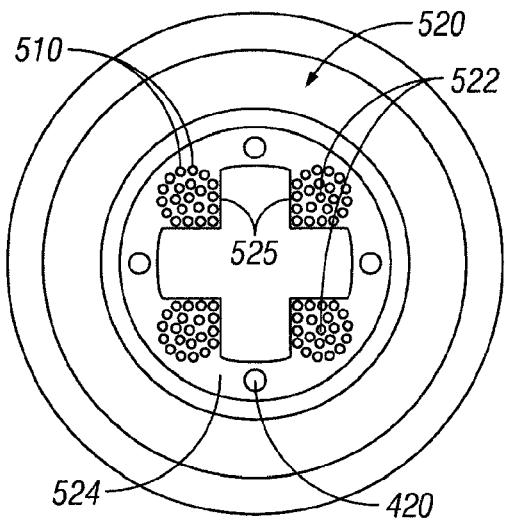
FIG. 8B is an end view similar to FIG. 8A illustrating a modified rear rim half with rock guard portions of a different shape.

FIG. 8B illustrates an end view of a modified rear rim half 520 with integral rock guard portions or formations 522 in its end wall 524. Rim half 520 may be used in place of rim half 502 when a different shaped hub is to be attached to the wheel, such as a hub 605 with square or V-shaped recesses 606 as in FIG. 6. The rock guard portions or formations 522 in the embodiment of FIG. 8B are similar or identical in shape to the rock guard formations of the reinforcement plate 246 illustrated in FIG. 2B, and have square or V-shaped inner edges 525. Multiple holes 510 are formed in each rock guard portion 522, as in the previous embodiments. The size of the holes may vary, and in some embodiments rock guard portion 522 may be solid with no holes. In an alternative embodiment, the square or V-shape rock guard formations may be formed integrally in the end wall 250 of the front rim half 235 rather than the end wall of the rear rim half. When a hub 605 is secured to a wheel incorporating rim half 520, the rock guard formations substantially block any opening which would otherwise extend through the wheel due to clearances between the outer periphery of the hub and the inner surface of the opening through a wheel which does not include any built-in wheel guard. Wheel guard formations of other shapes may be formed in the central opening of either wheel rim half in alternative embodiments, so as to match the indents or recesses of hubs of different shapes. In either of the rim halves 502 or 520, the rock guard portions may be made thinner than the remainder of the end wall 505 or 524, so as to reduce the weight of the wheel.

In the embodiments of FIGS. 7 to 10, rock guard formations are integral with the end wall of a wheel rim half, so the wheels will be of less weight than the wheel of FIGS. 2 to 6 which has a separate rock guard reinforcement plate sandwiched between the rim halves. Where a stronger structure is desired, the wheel of FIGS. 2 to 6 may be used since the reinforcement plate will add strength to the wheel and to the connection between the wheel and wheel hub. In either case, most or all debris which might cause damage, such as rocks, stones or the like, is blocked, due to the small size of the screen openings in the rock guard formations. The wheels of the above embodiments with a built-in rock guards avoid the need for separate rock guard plates to be installed between the hub and wheel and the problems of leaving openings in the wheels when an installer forgets to install a separate rock guard plate. These embodiments also reduce the expense and complexity of wheel installation and the amount of material required.

Figure 11:
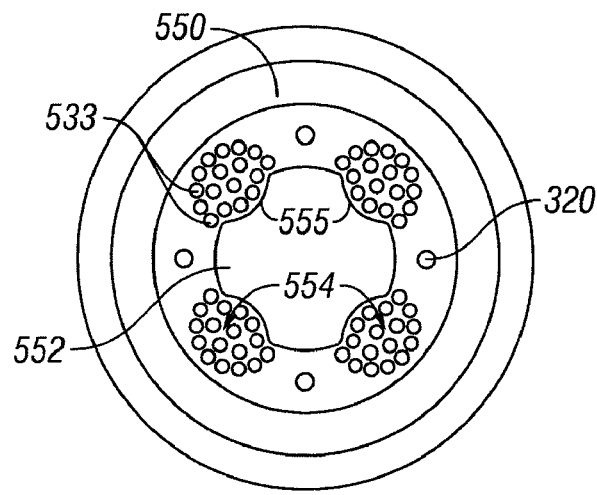
FIG. 11 is an end view of a rear wheel rim half with integral wheel guard portions of different shape.

FIG. 11 illustrates a modified wheel rim half 550 with integral rock guard portions 554 which may be used in place of wheel rim half 502 of FIGS. 7 to 10. Rear rim half 550 has a central opening 552 having inwardly extending rock guard portions 554 which are similar to the rock guard portions 504 in FIG. 8A, but which have a different shape inner peripheral edge 555. Rock guard edges 555 are each generally arcuate but are shorter in length and have a larger radius of curvature than the edges of rock guard portions 504 of FIG. 8A. As in the previous embodiments, each rock guard portion has a plurality of small openings 533 forming a mesh or filter for air flow and to block large debris. The advantage of rock guard portions 554 is that they substantially fill wheel openings formed when a wheel is attached to a number of different hubs. In other words, when rear rim half 550 is assembled into a wheel in place of rear rim half 502 of FIGS. 7, 9 and 10, it can form a rock guard when the wheel is secured to any selected hub of a plurality of different hubs with recesses of varying shapes.

Figure 12A:
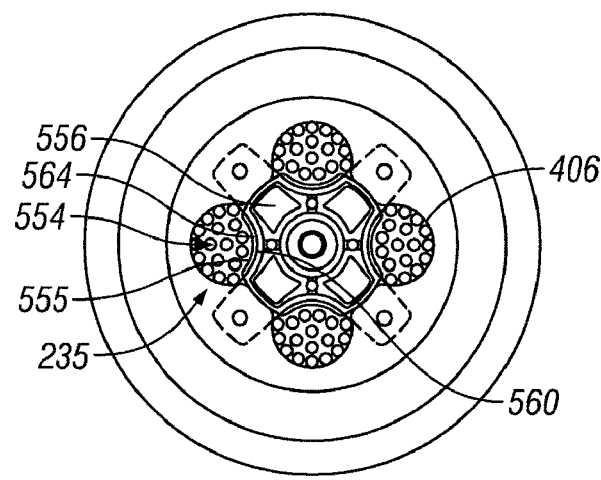
FIG. 12A is an end view of a wheel similar to FIG. 9 but with the rear wheel rim half of FIG. 11 secured to the front rim half of FIG. 9 and a first hub attached to the wheel.
Figure 12B:
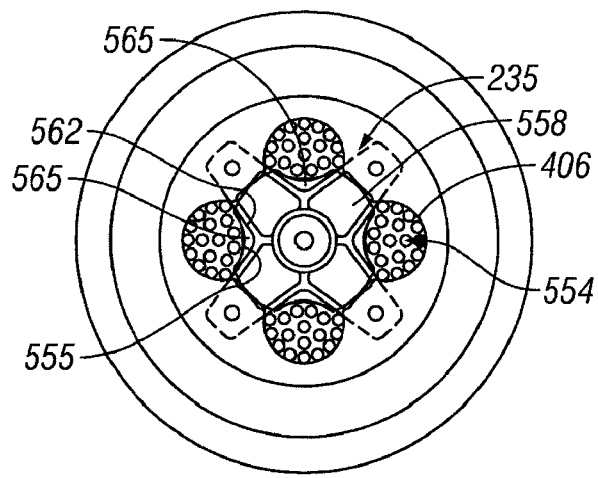
FIG. 12B is an end view of the wheel of FIG. 12A attached to a different hub.

FIGS. 12A and 12B illustrate the wheel rim half 550 assembled with front rim half 235 in place of the rear rim half 502 of FIG. 9, with FIG. 12A illustrating a first hub 556 attached to the wheel and FIG. 12B illustrating a second hub 558 attached to the wheel. The first hub 556 has arcuate recesses 560 between adjacent spokes, and is similar or identical to a hub made by Kawasaki Motors Corp. USA. The second hub 558 has V-shaped recesses 562 between adjacent spokes, and is similar or identical to a hub made by American Honda Motor Co., Inc. As illustrated in FIG. 12A, rock guard portions 554 substantially fill the space between the inner edge of an indent 406 in a wheel opening and the inner edge of the respective hub recess 560, leaving only a small gap 564. Similarly, in FIG. 12B, the rock guard portions 554 substantially fill the space between the inner edge 555 of each rock guard portion 554 and the inner edge of the respective hub recess 562, leaving only a small gap 565.

The shape and dimensions of rock guard portions 554 are designed so that any resultant gaps between edges 555 and the opposing hub recesses are relatively small and block larger debris from passing through the wheel, while allowing some airflow. Rock guard portions 554 may alternatively be formed integrally with a reinforcement plate to replace the rock guard reinforcement plate 245 or 246 in FIGS. 2 to 6.

Figure 13:
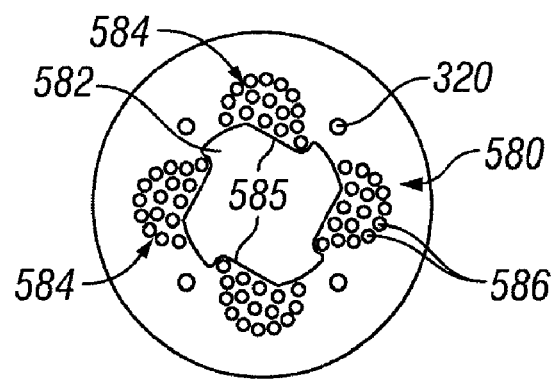
FIG. 13 is an end view of a reinforcement plate with modified wheel guard portions of different shape.

FIG. 13 illustrates a modified rock guard reinforcement plate 580 which may be used in place of any of the reinforcement plates of the previous embodiments. As in the previous embodiments, plate 580 is generally circular in shape, with a central opening 582 having inwardly extending rock guard portions 584 which are similar to the rock guard portions in FIGS. 2A and 2B, but which have a different shape inner peripheral edge 585. Other parts of plate 580 are identical to the previous embodiments and like reference numbers are used as appropriate. Rock guard portions 585 are each of generally gear-tooth like shape. As in the previous embodiments, each rock guard portion has a plurality of small openings 586 forming a mesh or filter for air flow and to block large debris. The reinforcement plate 580 of FIG. 13 is designed to mount between wheel rim halves to form a wheel with an integral rock guard designed for use with a different shape wheel hub 588, as illustrated in FIG. 14.

Figure 14:
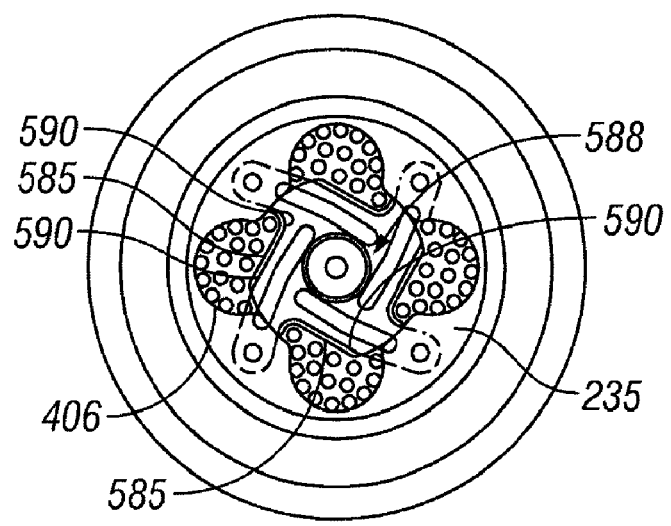
FIG. 14 is an end view similar to FIG. 6 but with the reinforcement plate of FIG. 13 installed between the wheel rim halves and a first hub attached to the wheel.

FIG. 14 illustrates the rock guard plate 580 assembled between wheel rim halves 235 and 240 in place of the rock guard plate 245 or 246 of FIGS. 4 to 6, with hub 588 attached to the wheel. The hub 588 has recesses 590 between adjacent spokes which substantially match the shape of the rock guard portions 585, so that rock guard portions 585 substantially fill the space between the edge 590 of hub recess and the inner edge 406 of the wheel opening, leaving only a small gap. The shape and dimensions of rock guard portions 585 are designed so that any resultant gaps between edges and the opposing hub recesses are relatively small and block larger debris from passing through the wheel, while allowing some airflow. Rock guard portions 554 may alternatively be formed integrally with a wheel rim half to replace the rock guard portions 504 or 522 in wheel 500.

In each of the above embodiments, a rock guard is built into the wheel. No separate rock guard plate outside the wheel is needed, avoiding the problem of an installer potentially forgetting the rock guard plate when attaching the wheel to a hub, and reducing the difficulty of installation. The amount of material and the number of parts are also reduced. Rock guard reinforcement plates for mounting between the rim halves and rock guard portions built into a wheel rim half can be provided in a range of different shapes and dimensions so as to at least substantially fill any space between indents in a wheel opening and opposing recesses in a range of different wheel hubs. The embodiment of FIGS. 11 and 12 has the added advantage that it can be used with a range of different hubs.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A wheel assembly for a vehicle, comprising:
a wheel having a front rim half and a rear rim half secured together to form an annular outer rim for receiving a tire;
the front and rear rim halves have aligned central openings for receiving wheel hub and aligned apertures for receiving fasteners for mounting the wheel hub on a hub face of the rear rim half;
the central opening of at least one of the rim halves having a plurality of spaced recesses around its periphery;
a rock guard built into the wheel having a plurality of rock guard portions each forming a shield which substantially fills any space between a respective recess and an attached wheel hub to block at least some debris from passing through the wheel; and each rim half having an end wall facing the end wall in the other rim half, the aligned central openings extending through the end walls, and wherein the rock guard is formed integrally with an end wall of one of the rim halves, the rock guard portions helping to define an outer periphery of the central opening in said one rim half.

2. The wheel assembly of claim 1, wherein each rock guard portion has a peripheral edge substantially matching a respective hub recess.

3. The wheel assembly of claim 1, wherein the rock guard portions are formed in the rear rim half.

4. The wheel assembly of claim 1 wherein the rock guard portions have arcuate edges.

5. The wheel assembly of claim 1, wherein the rock guard portions have V-shaped edges.

6. The wheel assembly of claim 1, wherein the rock guard portions each have a plurality of small openings in a mesh-like configuration.

7. A wheel assembly for a vehicle, comprising:
a wheel having a first rim half and a second rim half secured together to form an annular outer rim for receiving a tire, the wheel having a central opening extending through the rim halves;
a wheel hub mounted on the wheel to extend at least partially over the central opening;
the first and second rim halves having aligned apertures for receiving fasteners for mounting the wheel hub on the wheel;
the wheel hub having outwardly projecting portions extending over the fastener apertures in the rim halves and outwardly facing recesses between the outwardly projecting portions, the outwardly projecting portions of the wheel hub directly engaging an outer face of one of the rim halves outside the central opening;
the wheel having a built-in rock guard, the rock guard having a plurality of rock guard portions helping to define an outer periphery of the central opening in the wheel, each rock guard portion forming a shield which fills at least a major portion of any space between a respective hub recess and the periphery of the central opening of the wheel to block at least some debris from passing through the wheel; the first and second rim halves having inner end walls and annular portions extending outwardly from the respective end walls which together form an annular outer wheel rim for receiving a tire, the central opening in the wheel comprising aligned central openings in the end walls of the first and second rim halves; and the rock guard is formed integrally with an end wall of one of the rim halves.

8. The wheel assembly of claim 7, wherein the rock guard portions have a peripheral edge substantially matching an edge of a respective hub recess.

9. The wheel assembly of claim 7, wherein the rock guard portions have arcuate inner edges.

10. The wheel assembly of claim 7, wherein the rock guard portions have V-shaped inner edges.

11. The wheel assembly of claim 7, wherein the rock guard portions have inner edges, the inner edges and the outwardly facing recesses of the wheel hub are of different shapes.

* * * * *